US009811912B2

(12) United States Patent
Wu et al.

(10) Patent No.: US 9,811,912 B2
(45) Date of Patent: Nov. 7, 2017

(54) IMAGE PROCESSING APPARATUS, IMAGE PROCESSING METHOD AND MEDICAL IMAGING DEVICE

(71) Applicant: Toshiba Medical Systems Corporation, Otawara-shi (JP)

(72) Inventors: Jia Wu, Beijing (CN); Tatsuo Maeda, Nasushiobara (JP); Yanli Wang, Beijing (CN)

(73) Assignee: Toshiba Medical Systems Corporation, Otawara-shi (JP)

( * ) Notice: Subject to any disclaimer, the term of this patent is extended or adjusted under 35 U.S.C. 154(b) by 154 days.

(21) Appl. No.: 14/277,368

(22) Filed: May 14, 2014

(65) Prior Publication Data
US 2014/0341426 A1   Nov. 20, 2014

(30) Foreign Application Priority Data

May 14, 2013  (CN) .......................... 2013 1 0177532

(51) Int. Cl.
*G06T 7/155*  (2017.01)
*G06T 7/187*  (2017.01)
(Continued)

(52) U.S. Cl.
CPC .............. *G06T 7/0081* (2013.01); *G06T 7/11* (2017.01); *G06T 7/155* (2017.01); *G06T 7/174* (2017.01);
(Continued)

(58) Field of Classification Search
CPC ......... G06T 7/0012; G06T 2207/20141; G06T 2207/30101; G06T 7/0081;
(Continued)

(56) References Cited

U.S. PATENT DOCUMENTS 7,711,165 B2 * 5/2010 Lesage ................. G06T 7/0081
                                                  128/920
8,145,292 B2 * 3/2012 Vining ................. G06T 7/0012
                                                  345/419
(Continued)

OTHER PUBLICATIONS

Fabijanska, Two-pass region growing algorithm for segmenting airway tree from MDCT chest scans, Oct. 2009 [retrieved Jul. 6, 2016], Computerized Medical Imaging and Graphics, vol. 33, Issue 7, pp. 537-546. Retrieved from the Internet: http://www.sciencedirect.com/science/article/pii/S0895611109000512.*
(Continued)

*Primary Examiner* — Andrew Moyer
*Assistant Examiner* — Dennis Rosario
(74) *Attorney, Agent, or Firm* — Oblon, McClelland, Maier & Neustadt, L.L.P.

(57) ABSTRACT

An image processing apparatus includes a storage unit, a slice image generating unit, a region extracting unit and a tubular structure extracting unit. The storage unit stores a volume image of a three-dimensional region of a subject. The slice image generating unit generates a plurality of slice images corresponding to a plurality of slices each substantially perpendicular to a predetermined reference axis from the volume image. The region extracting unit extracts a target region from the plurality of slice images. The tubular structure extracting unit detects an end point from the extracted region, and extracts a tubular structure based on the end point.

22 Claims, 9 Drawing Sheets

(51) Int. Cl.
*G06T 7/00* (2017.01)
*G06T 7/11* (2017.01)
*G06T 7/174* (2017.01)

(52) U.S. Cl.
CPC .... *G06T 7/187* (2017.01); *G06T 2207/10072* (2013.01); *G06T 2207/20036* (2013.01); *G06T 2207/20044* (2013.01); *G06T 2207/30101* (2013.01); *G06T 2207/30172* (2013.01)

(58) Field of Classification Search
CPC . G06T 2207/10081; G06T 2207/30061; G06T 7/11; G06T 7/155; G06T 7/187; G06T 7/0091
See application file for complete search history.

(56) References Cited

U.S. PATENT DOCUMENTS

| | | |
|---|---|---|
| 2006/0159328 A1 | 7/2006 | Vaz et al. |
| 2007/0121787 A1 | 5/2007 | Kiraly et al. |
| 2007/0127800 A1 | 6/2007 | Coenen et al. |
| 2009/0161927 A1 | 6/2009 | Mori et al. |
| 2010/0296709 A1* | 11/2010 | Ostrovsky-Berman G06T 7/0081 382/128 |
| 2011/0026789 A1* | 2/2011 | Hsu ...................... G06K 9/0061 382/128 |
| 2011/0081057 A1* | 4/2011 | Zeng ..................... G06T 7/0012 382/128 |

OTHER PUBLICATIONS

Irving et al., 3D segmentation of the airway tree using a morphology based method, Sep. 20, 2009 [retrieved Jul. 6, 2016], The Second International Workshop on Pulmonary Image Analysis, pp. 297-307. Retrieved from the Internet: http://www.lungworkshop.org/2009/program.html.*

Gao et al., MGRG-Morphological Gradient Based 3D Region Growing Algorithm for Airway Tree Segmentation in Image Guided Intervention Therapy, Nov. 3-5, 2011 [retrieved Dec. 8, 2016], 2011 International Symposium on Bioelectronics and Bioinformatics, pp. 76-79. Retrieved from the Internet: http://ieeexplore.ieee.org/document/6107649/?arnumber=6107649.*

* cited by examiner

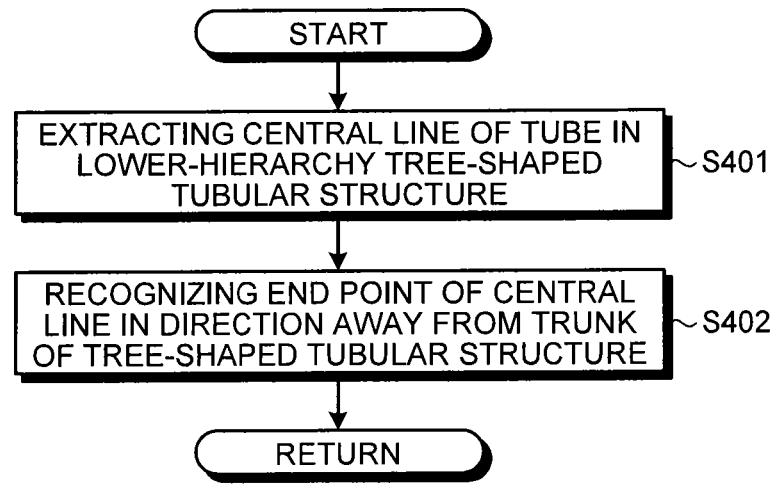
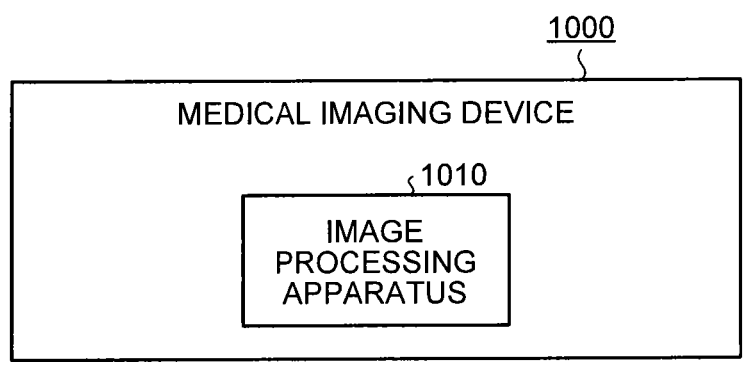

IMAGE PROCESSING APPARATUS, IMAGE PROCESSING METHOD AND MEDICAL IMAGING DEVICE

CROSS-REFERENCE TO RELATED APPLICATIONS

This application is based upon and claims the benefit of priority from Chinese Patent Application No. 201310177532.8, filed on May 14, 2013, the entire contents of which are incorporated herein by reference.

FIELD

The application relates to the field of image processing and more specifically to an image processing apparatus and an image processing method and a medical imaging device.

BACKGROUND

In the field of image processing, there is an application of segmenting, from an image obtained, a part representing the structure of a target object. As a typical example, this structure is, for example, a tree-shaped tubular structure. Due to the limitations imposed by various noises in the image and resolution, it may be difficult to obtain a complete and correct tree-shaped tubular structure directly from an image, especially when the region of interest is close to a twig, that is, the region of interest is of a relatively higher branching level of the tubular structure. Therefore, a specific image processing method is usually needed to further process the image.

For example, in modern medicine, the segmentation of an airway tree or blood vessel from an obtained medical image is of important clinical significance. Taking the airway tree as an example, the lung is scanned to obtain the volume image thereof in which pulmonary parenchyma and a desired airway tree structure are contained, and then the airway tree is segmented using various image processing methods, thereby facilitating the positioning of bronchia of different branching levels and the measuring of characteristics of branches thereof.

BRIEF DESCRIPTION OF THE DRAWINGS

The present invention will be better understood with reference to the following description taken in conjunction with accompanying drawings in which identical or like reference signs designate identical or like components. The accompanying drawings, together with the detailed description below, are incorporated into and form a part of the specification and further serve to illustrate, by way of example, preferred embodiments of the present invention and to explain the principle and advantages of the present invention. In the accompanying drawings:

FIG. 9 is a flowchart of the sub-steps of the recognition step of an image processing method according to the first to the third embodiment;

FIG. 10 is a schematic block diagram illustrating a medical imaging device according to a forth embodiment;

DETAILED DESCRIPTION

Figure 1:
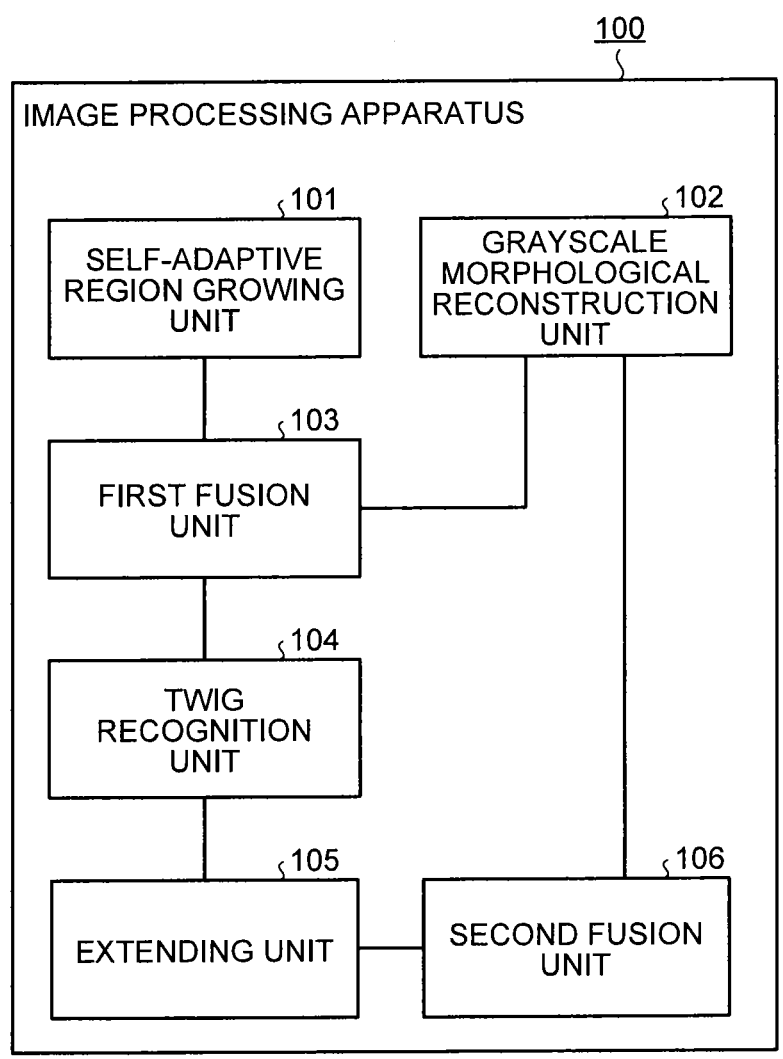
FIG. 1 is a block diagram illustrating the structure of an image processing apparatus according to a first embodiment.

A simplified summary of embodiments is given below to provide a basic understanding of some aspects of the embodiments. It should be appreciated that the summary, which is not an exhaustive overview of the embodiments, is not intended to identify the key or critical parts of the embodiments nor limit the scope of the embodiments, but merely to present some concepts in a simplified form as a prelude to the more detailed description that is discussed later.

It is an object of the embodiments to provide an accurate image processing apparatus, image processing method and medical imaging device which are capable of acquiring a tree-shaped tubular structure as fine as possible.

In accordance with an aspect of the embodiments, there is provided an image processing apparatus including: a storage unit configured to store a volume image of a three-dimensional region of a subject; a slice image generating unit configured to generate a plurality of slice images corresponding to a plurality of slices each substantially perpendicular to a predetermined reference axis from the volume image; a region extracting unit configured to extract a target region from the plurality of slice images; and a tubular structure extracting unit configured to detect an end point from the extracted region, and to extract a tubular structure based on the end point.

In accordance with an aspect of the embodiments, there is provided an image processing apparatus for segmenting an object having a tree-shaped tubular structure from a volume image formed by a series of images imaged on the basis of slices, including: a self-adaptive region growing unit configured to perform region growing on the basis of the volume image, based on a seed point and a preset threshold, to obtain a first tree-shaped tubular structure; a grayscale morphological reconstruction unit configured to perform grayscale morphological reconstruction based on local extrema for each one of the series of images respectively, to obtain candidate data capable of constructing at least part of the tree-shaped tubular structure; a first fusion unit configured to fuse the first tree-shaped tubular structure with at least part of the candidate data, to obtain a lower-branching level tree-shaped tubular structure of the object; a twig recognition unit configured to recognize a twig of the lower-branching level tree-shaped tubular structure; an extending unit configured to provide a pixel point corresponding to the recognized twig to the self-adaptive region growing unit as a seed point to further perform local region growing based on the volume image, to obtain an extended branch; and a second fusion unit configured to fuse the extended branch with at least part of the remaining part of the candidate data, to obtain a higher-branching level tree-shaped tubular structure of the object.

In accordance with another aspect of the embodiments, a medical imaging device includes the image processing apparatus according to the above aspects of the embodiments.

In accordance with still another aspect of the embodiment, there is provided an image processing method executed by an image processing apparatus wherein the image processing apparatus includes a storage unit configured to store a volume image of a three-dimensional region of a subject, the image processing method including: generating a plurality of slice images corresponding to a plurality of slices each substantially perpendicular to a predetermined reference axis from the volume image; extracting a target region from the plurality of slice images; and detecting an end point from the extracted region, and extracting a tubular structure based on the end point.

In accordance with still another aspect of the embodiments, there is provided an image segmentation method for segmenting an object having a tree-shaped tubular structure from a volume image formed by a series of images imaged on the basis of slices, the image segmentation method including: a self-adaptive region growing step of performing region growing on the basis of the volume image, based on a seed point and a preset threshold, to obtain a first tree-shaped tubular structure; a grayscale morphological reconstruction step of performing grayscale morphological reconstruction based on local extrema for each one of the series of images respectively to obtain candidate data capable of constructing at least part of the tree-shaped tubular structure; a first fusion step of fusing the first tree-shaped tubular structure with at least part of the candidate data, to obtain a lower-branching level tree-shaped tubular structure of the object; a recognition step of recognizing a twig of the lower-branching level tree-shaped tubular structure; an extending step of further performing local region growing on the basis of the volume image by taking a pixel point corresponding to the recognized twig as a seed point, to obtain an extended branch; and a second fusion step of fusing the extended branch with at least part of the remaining part of the candidate data, to obtain a higher-branching level tree-shaped tubular structure of the object.

Further, in accordance with yet another aspect of the embodiments, there is provided a computer program for realizing the aforementioned image processing method.

Additionally, in accordance with yet still another aspect of the embodiments, there is provided a computer program product in the form of a medium at least readable to a computer, on which computer program codes for realizing the aforementioned image processing method are recorded.

In the image processing method, image processing apparatus and medical imaging device disclosed herein, through obtaining one part of a tree-shaped structure using the self-adaptive region growing method in combination with the grayscale morphological reconstruction method, and performing further region growing by taking the twig of the obtained tree-shaped structure as a seed point to obtain an extended branch, which is fused again with the data resulting from the grayscale morphological reconstruction, the advantages of the self-adaptive region growing method and the grayscale morphological reconstruction method can be fully made use of, and a tree-shaped tubular structure of as high branching level as possible can be obtained.

Embodiments are described below with reference to accompanying drawings. The elements and features described in one of the accompanying drawings or embodiments may be combined with those shown in one or more other accompanying drawings or embodiments. It should be noted that for the sake of clarity, the representation and description on the components and processing that are irrelative with the embodiments but well known by those skilled in the art are omitted.

First Embodiment

As shown in FIG. 1, an image processing apparatus 100 for segmenting an object having a tree-shaped tubular structure from a volume image formed by a series of images imaged on the basis of slices according to an embodiment includes: a self-adaptive region growing unit 101, configured to perform region growing on the basis of the volume image, based on a seed point and a preset threshold to obtain a first tree-shaped tubular structure; a grayscale morphological reconstruction unit 102, configured to perform grayscale morphological reconstruction based on local extrema for each one of the series of images, to obtain candidate data capable of constructing at least part of the tree-shaped tubular structure; a first fusion unit 103, configured to fuse the first tree-shaped tubular structure with at least part of the candidate data, to obtain a lower-branching level tree-shaped tubular structure of the object; a twig recognition unit 104, configured to recognize a twig of the lower-branching level tree-shaped tubular structure; an extending unit 105, configured to provide a pixel point corresponding to the recognized twig to the self-adaptive region growing unit 101 as a seed point to further perform local region growing on the basis of the volume image, to obtain an extended branch; and a second fusion unit 106, configured to fuse the extended branch with at least part of the remaining part of the candidate data, to obtain a higher-branching level tree-shaped tubular structure of the object.

Generally, the tree-shaped tubular structure mentioned herein has a plurality of branching levels of branches, and the tubular part of the branch of a higher branching level has a smaller dimension, that is, a smaller tube diameter. Examples of the object having a tree-shaped tubular structure include, but are not limited to: road, the root system of a vegetable, and a blood vessel, airway tree or skeleton of human body and so on. As an example, an airway tree may include up to 24 branching levels of bronchi. However, the object having a tree-shaped tubular structure may contain or be contained in or intersected with another object, making it difficult to segment the object directly from the volume image. In some cases, the resolution of the obtained image is limited, which increases the difficulty of the segmentation as well. The image processing apparatus 100 acquires a tree-shaped tubular structure of as high branching level as possible (or as small dimension as possible) in a way where the self-adaptive region growing is in combination with the grayscale morphological reconstruction method. For example, an image processing apparatus includes a storage unit, a slice image generating unit, a region extracting unit and a tubular structure extracting unit. The storage unit stores a volume image of a three-dimensional region of a subject. The slice image generating unit generates a plurality of slice images corresponding to a plurality of slices each substantially perpendicular to a predetermined reference axis from the volume image. The region extracting unit extracts a target region from the plurality of slice images. The tubular structure extracting unit detects an end point from the extracted region, and extracts a tubular structure based on the end point.

First, the slice image generating unit images the object having a tree-shaped tubular structure on the basis of slices to obtain a series of images, which can be laminated along the sliced direction to constitute a volume image reflecting the three-dimensional structure of the object. The region extracting unit extracts a region concerning a target site from the series of slice image. For example, the region extracting unit includes a self-adaptive region growing unit 101, a grayscale morphological reconstruction unit 102 and the first fusion unit 103. The self-adaptive region growing unit 101 sets one or more seed points in the volume image. As the tube wall of the tree-shaped tubular structure to be segmented separates the internal cavity from the surrounding part to represent, in the image, the internal cavity and the surrounding part as areas having different pixel value ranges, that is, having respective common feature, therefore, the self-adaptive region growing unit 101 can realize region growing by continuously determining whether or not points nearby a seed point have the feature or accord with a given growing standard. The seed point may be set automatically. In an embodiment, the seed point can be set on the trunk of the tree-shaped structure. Such a setting can be realized through a simple preprocessing, which is not described in further detail here.

Specially, the self-adaptive region growing unit 101 may compare the difference between the pixel value of a point in the neighborhood of the seed point and the pixel value of the seed point, and/or the difference between the pixel value of a point in the neighborhood of the seed point and the average pixel value of the grown points with a preset region growing threshold (also called "first threshold"), to determine whether or not to grow the point. The region growing threshold may be empirically set according to the range of the pixel values generally presented by the tree-shaped tubular structure in the image. For example, if the difference is within the range of the region growing threshold, then the point is deemed to be one in the tubular structure. The first tree-shaped tubular structure can be finally obtained through such a continuous growing process.

However, since such growing is only restricted by the region growing threshold, if the resolution of the image is relatively low or the dimension of the tubular structure is relatively small, there easily occurs a case of error growing, for example, a great number of pseudo branches are grown or the growing of a real branch is omitted. Therefore, the self-adaptive region growing unit 101 further sets a leakage controlling threshold to make judgment on the grown tree-shaped tubular structure. Specifically, the self-adaptive region growing unit 101 may make judgment according to the pixel percentage of the first tree-shaped tubular structure grown. The leakage controlling threshold is set so that the ratio of extracted part to overall volume is not become too large. For example, if the proportion of the pixel number of the grown tree-shaped tubular structure to the pixel number of the whole image is higher than the preset leakage controlling threshold, then it is deemed that many of the branches grown are pseudo branches and that the tree-shaped tubular structure obtained at this time is incorrect. If the pixel number of the whole image is fixed, the pixel number of the tree-shaped tubular structure can be equivalently used as a basis for the judgment. It should be appreciated that the rule for the judgment can be modified in a variety of ways as needed, but is not limited hereto.

Further, if it is determined that there is error growing, the self-adaptive region growing unit 101 may change the region growing threshold to perform region growing again.

As stated above, the self-adaptive region growing unit 101, although having the advantages of high speed and simplicity, can only obtain a dimension-limited tree-shaped tubular structure, that is, the self-adaptive region growing unit 101 cannot obtain a tubular structure small enough in dimension. Therefore, to segment a relatively tiny tubular region, that is, to extract the tubular structure of a relatively higher branching level of the object, the image processing apparatus 100 further includes a grayscale morphological reconstruction unit 102, which is configured to perform grayscale morphological reconstruction based on local extrema for each one of the series of images, to obtain candidate data capable of constructing at least part of the tree-shaped tubular structure.

The grayscale morphological reconstruction unit 102 utilizes the following principle: a point corresponding to the inside of a tubular structure is where a maximum or minimum of the pixel values is located. Therefore, it can be deemed that the local extrema in each slice of image correspond to candidate regions where the tubular structure may be located, in other words, the candidate regions can constitute at least part of the tree-shaped tubular structure.

Figure 2:
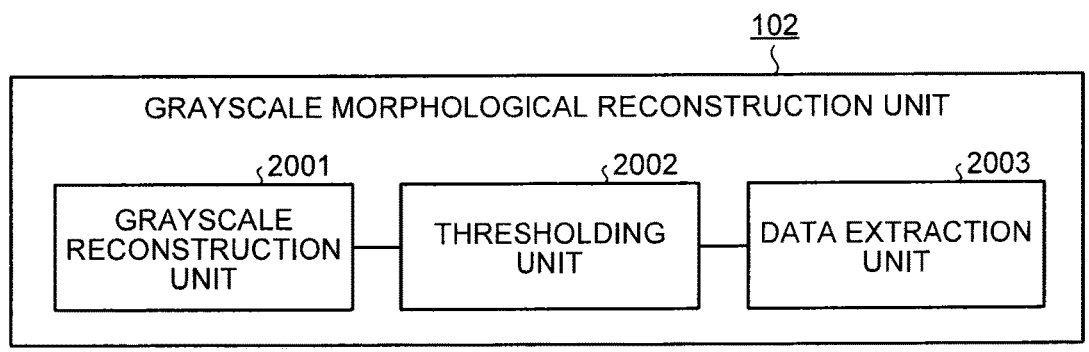
FIG. 2 is a block diagram illustrating the structure of a grayscale morphological reconstruction unit according to the first embodiment.

The configuration of an example of the grayscale morphological reconstruction unit 102 is briefly described below with reference to FIG. 2. As shown in FIG. 2, the grayscale morphological reconstruction unit 102 includes: a grayscale reconstruction unit 2001 configured to perform grayscale morphological reconstruction for each one of the series of images, to obtain a marked image with the local extrema in the original image identifiable; a thresholding unit 2002 configured to compare the marked image with a second preset threshold and reserve merely the part of the marked image with a value higher than the second preset threshold; and a data extraction unit 2003 configured to extract the spatial coordinates of the part reserved by the thresholding unit 2002 and the corresponding pixel values of the part in the original image as the candidate data.

The morphological reconstruction is a kind of morphological transform which uses a marked image, a mask image and a structural element and extracts the related shape information from the image based on the open operation or close operation, and it is a generalization of the flood fill algorithm. The marked image indicates the connected part of the original image to be reserved, the mask image restricts the morphological transform, and the structural element defines connectivity. The size of the structural element employed should be equivalent to that of the structure of interest.

A bright point or area in the marked image obtained represents the position where a local extremum is located. However, as not all bright points or areas are corresponding to actual tubular structures, the marked image should be thresholded if needed. In this embodiment, the thresholding unit 2002 only reserves the part of the marked image with a value higher than the second preset threshold and is therefore capable of removing most of regions which are actually not tubular structured.

As can be known from the above, the selection of the second preset threshold, which may be based on the property of the object and a required segmentation precision, determines the part finally reserved by the thresholding unit 2002. In an embodiment, the second preset threshold is a percentage of the difference between the maximum value and the minimum value in the marked image.

By changing the size of the structural element used by the grayscale reconstruction unit 2001 and the second preset threshold used by the thresholding unit 2002, the smallest dimension of the tree-shaped tubular structure that can be obtained by the grayscale morphological reconstruction unit 102 can be changed. Thus, in an embodiment, the grayscale morphological reconstruction unit 102 may obtain a plurality of groups of candidate data of the tree-shaped tubular structure different in dimension. It should be noted that if it is mentioned that the dimension of a tree-shaped tubular structure corresponding to a group of candidate data is A, it indicates that the group of candidate data corresponds to a tree-shaped tubular structure having a dimension greater than or equal to A. As a result, the candidate data of a smaller dimension contains the candidate data of a relatively larger dimension, in other words, candidate data of a higher-branching level tree-shaped tubular structure contains that of a lower-branching level tree-shaped tubular structure.

As stated above, after the thresholding unit 2002 completes the processing, the data extraction unit 2003 only takes the part which is reserved and considered quite likely to be a tubular structure into consideration, and then extracts the spatial coordinates of the part and corresponding pixel values of the part in the original image as the candidate data, for the fusion unit 103 and the second fusion unit 106 to use.

In addition, to achieve a higher processing speed, the grayscale morphological reconstruction unit 201 may only operate on a part containing relatively finer tubular region of the image, that is, the grayscale morphological reconstruction unit 201 only obtains candidate data of a tree-shaped tubular structure of a relatively higher branching level. The specific algorithm for grayscale morphological reconstruction may be referred to, for example, 'Segmentation and Analysis of the Human Airway Tree From Three-Dimensional X-Ray CT images' issued by Deniz Aykac etc., in August 2003 in Vol. 22, No. 8, IEEE Transactions On Medical Imaging, the whole contents of which are incorporated herein by reference.

As the grayscale morphological reconstruction unit 102 is capable of obtain a part of the tree-shaped tubular structure small in dimension, therefore, a more complete and fine tree-shaped tubular structure can be obtained by combining the grayscale morphological reconstruction unit 102 and the self-adaptive region growing unit 101.

The following situation may be taken into consideration in a variant: part of the candidate region found by the grayscale morphological reconstruction unit 102 may not be part of a tree-shaped tubular structure, or the candidate region is partially overlapped with the first tree-shaped tubular structure obtained by the self-adaptive region growing unit 101.

Therefore, the image processing apparatus 100 may use the first fusion unit 103 to achieve this fusion. For example, the candidate data may be screened based on the spatial continuity of the tubular structure to achieve the fusion, and during this process, at least part of the candidate data forms a new tree-shaped tubular structure on the basis of the first tree-shaped tubular structure. It should be appreciated that the fusion should accord with a certain logic and causality, rather than be a simple combination.

As an example, the first fusion unit 103 is configured to perform binary image region growing based on the candidate data on the first tree-shaped tubular structure, wherein the binary image region growing includes growing the part of the candidate data which is spatially connected with each branch of the first tree-shaped tubular structure into a second tree-shaped tubular structure, wherein the first tree-shaped tubular structure and the second tree-shaped tubular structure form the lower-branching level tree-shaped tubular structure. It should be appreciated that the lower-branching level tree-shaped tubular structure is a relative concept with respect to the part of tree-shaped tubular structure obtained using the twig recognition unit 104, the extending unit 105 and the second fusion unit 106 which will be described later, that is, the branching level of the tree-shaped tubular structure obtained here is lower than the branching level of the latter.

Although the first fusion unit 103 can obtain a tree-shaped tubular structure which is smaller in dimension than that obtained by the self-adaptive region growing unit 101, the following situation often happens: when the candidate data obtained by the grayscale morphological reconstruction unit 102 is capable of constructing a tree-shaped tubular structure much smaller in dimension than the tree-shaped tubular structure the self-adaptive growing unit 101 can obtain, the candidate data corresponding to a tree-shaped tubular structure of a small dimension (that is, a high branching level) cannot be fused on the first tree-shaped tubular structure by the first fusion unit 103. That is, there is a disconnection between the first tree-shaped tubular structure and the candidate data, that is, one part of the tree-shaped tubular structure between the first tree-shaped tubular structure and the candidate data is neither grown by the self-adaptive region growing unit 101 nor recognized by the grayscale morphological reconstruction unit 102.

To cope with this situation, the tubular structure extracting unit of the image processing apparatus 100 detects an end point from the extracted region, and extracts a tubular structure based on the end point. The tubular structure extracting unit further includes a twig recognition unit 104, an extending unit 105 and a second fusion unit 106 to further utilize the above mentioned part of candidate data. The twig recognition unit 104 is configured to recognize the twig of the lower-branching level tree-shaped tubular structure obtained. The 'twig' mentioned here refers to the terminal of a branch of the tree-shaped tubular structure in a direction away from the trunk.

In an embodiment, the twig recognition unit 104 is further configured to determine the branching level of the tubular structure at the recognized twig in the tree-shaped tubular structure, and reserve the corresponding twig only when the branching level is lower than a predetermined branching level. If the branching level of the tubular structure at the recognized twig is already high enough, for example, as high as a desired branching level or the highest branching level of the tree-shaped tubular structure corresponding to the candidate data obtained by the grayscale morphological reconstruction unit 102, then no further extension is needed, and consequently the twig is discarded.

In an embodiment, the twig recognition unit 104 determines the branching level of the tubular structure at the twig based on the sectional area of a lumen at the twig. It should be appreciated that the larger the sectional area of the lumen at the twig is, the lower the branching level of the tubular structure at the twig is, otherwise, the higher the branching level of the tubular structure at the twig is.

Figure 3:
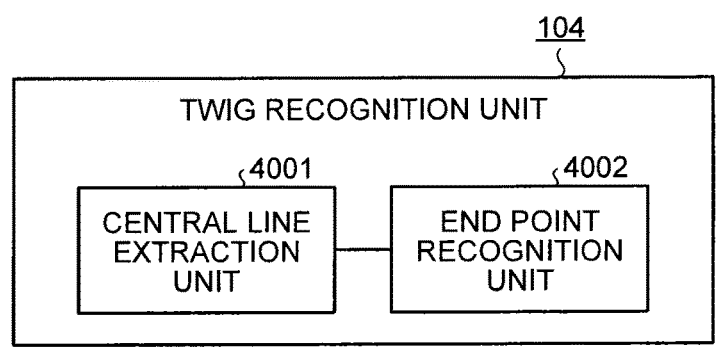
FIG. 3 is a block diagram illustrating the structure of a twig recognition unit according to the first embodiment.

FIG. 3 is a block diagram showing the structure of a specific example of the twig recognition unit 104. As shown in FIG. 3, the twig recognition unit 104 includes: a central line extraction unit 4001 configured to extract the central line of a tube in the lower-branching level tree-shaped tubular structure, and an end point recognition unit configured to recognize the end point of the central line in a direction away from the trunk of the tree-shaped tubular structure.

The central line extraction unit 4001 may extract the central line of the tube using various existing methods, such as a skeletonization method based on distance transform or a three-dimensional thinning method based on topology structure. In an embodiment, the end point recognition unit 4002 is configured to take a point on the central line which is adjacent to only one of the other points as an end point. For example, the end point recognition unit 4002 takes the point on the central line which is adjacent to the other points on the central line in only one of 26 neighborhoods as the end point. It should be appreciated that the end point may also be recognized using other methods.

After the twig is recognized, the extending unit 105 takes the pixel point corresponding to the twig as a seed point, and performs local region growing based on this seed point to obtain an extended branch. The local region growing performed here, which is the same as the region growing performed to obtain the first tree-shaped tubular structure in principle and merely different from the latter in parameter setting, is not repeatedly described here. Here, the extending unit 105 may perform the growing by its own based on the principle similar to that used by the self-adaptive region growing unit 101, or provide the seed point to the self-adaptive region growing unit 101 for growing to obtain the extended branch. In other words, the extending unit 105 and the self-adaptive region growing unit 101 may be the same unit or different units. Thus, the extending unit 105 and the self-adaptive region growing unit 101 involved in Claims should be interpreted as above.

When the self-adaptive region growing unit 101 grows the first tree-shaped tubular structure and the extended branch, as the twice growing aim at the whole tree-shaped tubular structure and a local structure, respectively, it can be appreciated that the preset thresholds used at the time of growing the extended branch can be adjusted in order to obtain an extended branch of a small dimension so that a more complete tree-shaped tubular structure is obtained. Therefore, in an embodiment, the self-adaptive region growing unit 101 is configured to use different preset thresholds, for example including a region growing threshold and/or a leakage controlling threshold, in the local region growing and in the region growing performed to obtain the first tree-shaped tubular structure.

Further, in an embodiment, the extending unit 105 further includes a comparison unit configured to compare the pixel value of the recognized seed point with a preset seed point threshold range, and discard the seed point the pixel value of which is beyond the seed point threshold range. That is, the extending unit 105 discards the seed points which are probably the results of incorrect growing by further selecting the recognized seed points in advance, thereby increasing the probability that the obtained extended branch is a correct branch.

After the extended branch is obtained, the second fusion unit 106 further fuses the extended branch with at least part of the remaining part of the candidate data obtained by the grayscale morphological reconstruction unit 102, to obtain a higher-branching level tree-shaped tubular structure. Similarly, the higher-branching level tree-shaped tubular structure mentioned herein is also a relative concept.

As grown from the twig of the lower-branching level tree-shaped tubular structure, the extended branch may have spatial continuity with the tree-shaped tubular structure corresponding to the remaining part of the candidate data. In other words, the second fusion unit 106 may obtain a tree-shaped tubular structure of a higher branching level. The extended branch to be fused may be 'attached' on the first tree-shaped tubular structure. In this case, in order to obtain a tree-shaped tubular structure of a higher branching level, the extended branch naturally forms a more complete tree-shaped tubular structure together with the existing first tree-shaped tubular structure.

In an embodiment, the second fusion unit 106 is configured to perform binary image region growing based on the remaining part of the candidate data on the extended branch, wherein the binary image region growing includes growing the part of the remaining part of the candidate data spatially connected with the extended branch into a third tree-shaped tubular structure, wherein the extended branch and the third tree-shaped tubular structure form the higher-branching level tree-shaped tubular structure.

Additionally, as stated above, the grayscale morphological reconstruction unit 102 may obtain a plurality of groups of candidate data of a tree-shaped tubular structure different in dimension. In an embodiment, the first fusion unit 103 can use the candidate data large in dimension in the plurality of groups of candidate data, and the second fusion unit 106 can use the candidate data small in dimension in the plurality of groups of candidate data.

In this case, if the tree-shaped tubular structure fused by the second fusion unit 106 using the candidate data smallest in dimension is incorrect, for example failed to meet the restriction of the leakage controlling threshold, the candidate data having the second smallest dimension is used to perform the fusion again, and so on and so forth, until the dimension of the candidate data to be used is the same as that of the candidate data used by the first fusion unit 103.

As stated above, the principles of the first fusion unit 103 and the second fusion unit 106 are similar. Therefore, the first fusion unit 103 and the second fusion unit 106 may be implemented as the same one unit. Claims should be interpreted to cover the situation that the first fusion unit 103 and the second fusion unit 106 are implemented as one unit or different units.

The structure and function of an image processing apparatus 100 according to an embodiment are described with reference to FIG. 1-FIG. 3. It can be seen that the image processing apparatus 100 can obtain a tree-shaped tubular structure of a relatively higher branching level, by performing further extending growing and fusion for the obtained lower-branching level tree-shaped tubular structure.

The image processing apparatus includes an editing unit configured to edit the central line in accordance with an instruction of an operator. The image processing apparatus includes an updating unit configured to update at least one of the preset threshold for the region growing and set value for the grayscale morphological reconstruction in accordance with an instruction of an operator.

Second Embodiment

Figure 4:
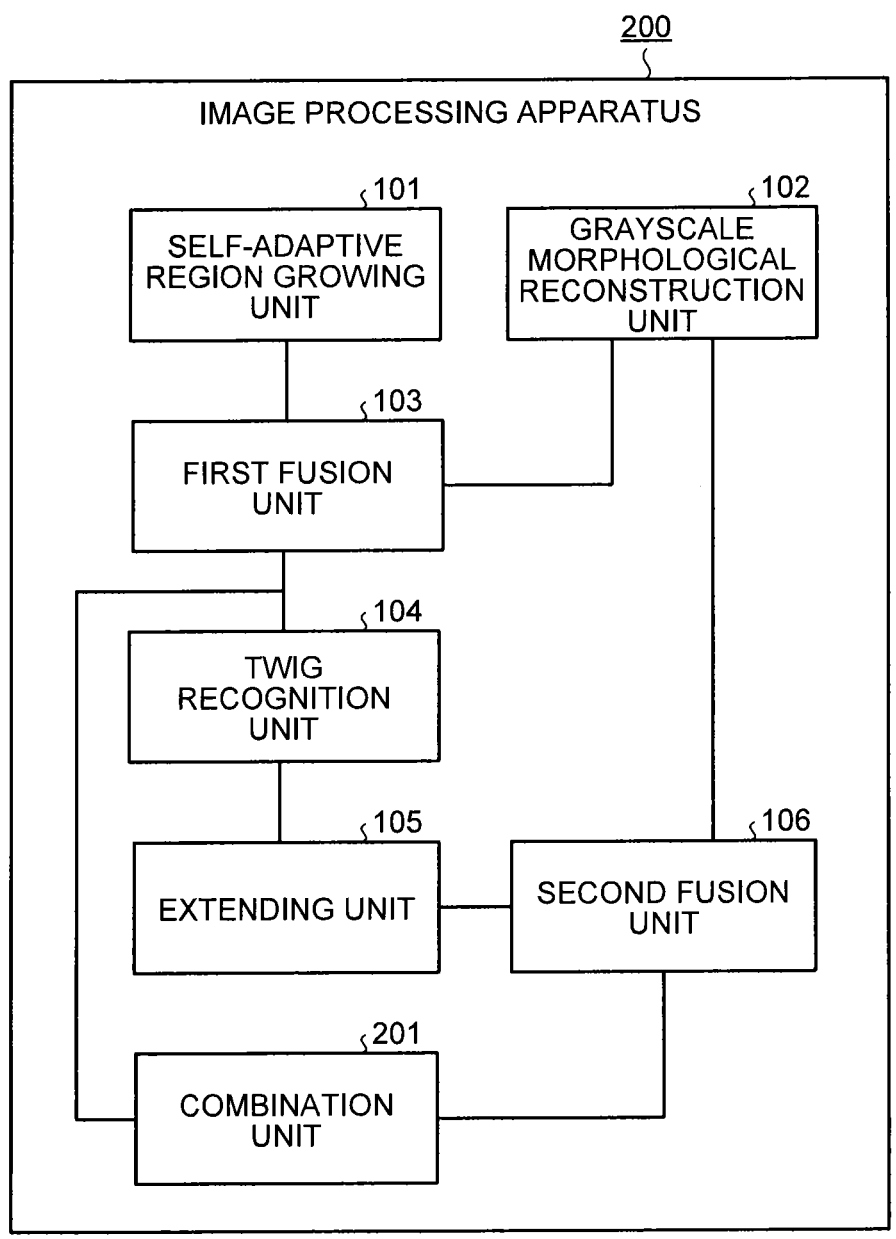
FIG. 4 is a block diagram illustrating the structure of an image processing apparatus according to a second embodiment.

An image processing apparatus 200 according to another embodiment is described below with reference to FIG. 4. As shown in FIG. 4, in addition to each unit shown in FIG. 1, the image processing apparatus 200 further includes a combination unit 201 configured to combine the lower-branching level tree-shaped tubular structure with the higher-branching level tree-shaped tubular structure to obtain a tree-shaped tubular structure of the object. As the extended branch is grown from the twig of the lower-branching level tree-shaped tubular structure, the second fusion unit 106 may fuse only the extended branch with the remaining part of the candidate data, without using the existing first tree-shaped tubular structure, and thus, there is neither an identical part nor a disconnected part in the obtained higher-branching level tree-shaped tubular structure and the lower-branching level tree-shaped tubular structure, a combination can be directly performed to obtain a relatively complete tree-shaped tubular structure.

Third Embodiment

Figure 5:
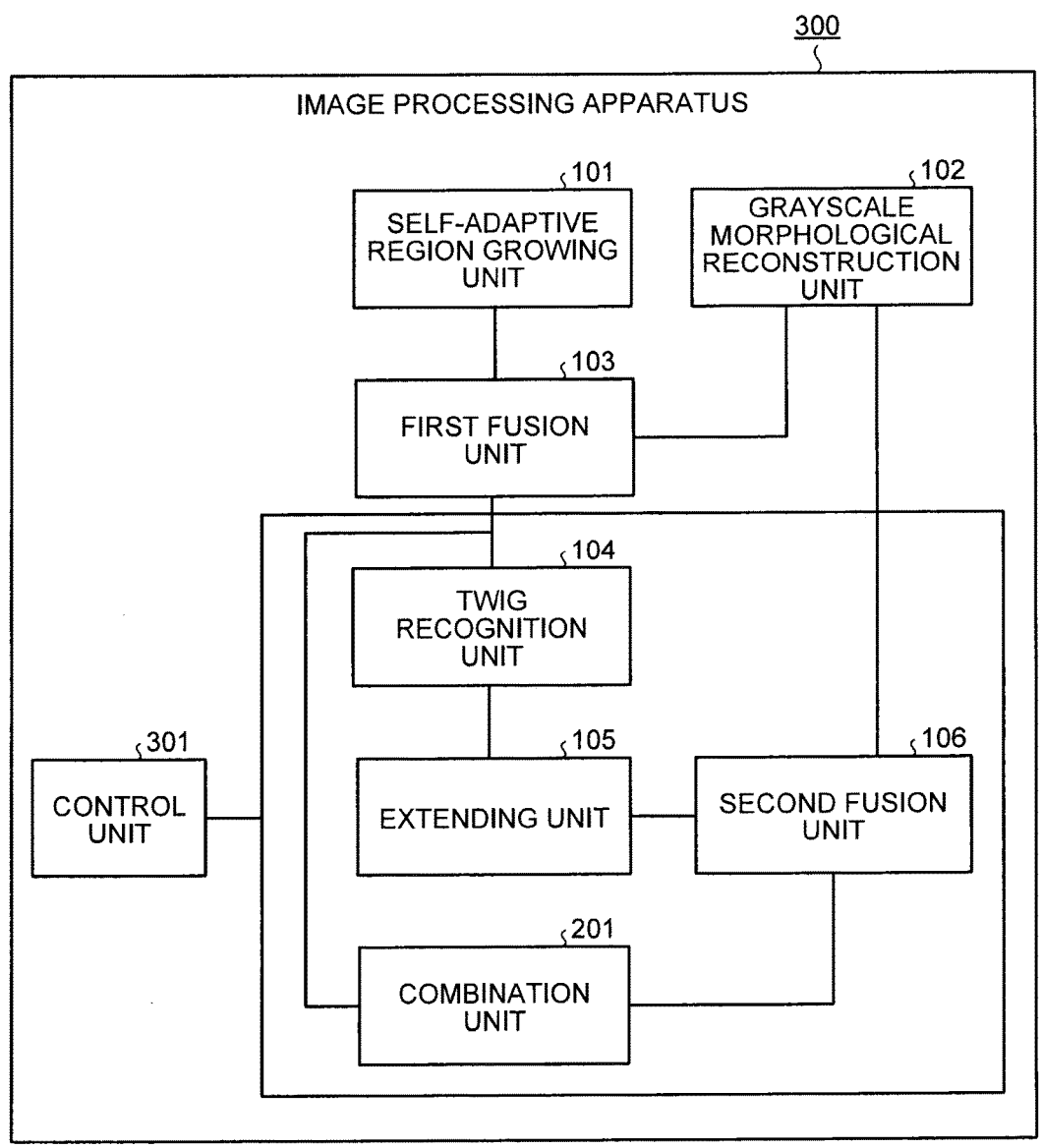
FIG. 5 is a block diagram illustrating the structure of an image processing apparatus according to a third embodiment.

In addition, FIG. 5 shows the structure of an image processing apparatus 300 according to still another embodiment. As shown in FIG. 5, in addition to each unit of the image processing apparatus 200 shown in FIG. 4, the image processing apparatus 300 further includes a control unit 301 configured to provide the tree-shaped tubular structure of the object obtained by the combination unit 201 to the twig recognition unit 104 as a lower-branching level tree-shaped tubular structure, so that the twig recognition unit 104, the extending unit 105 and the second fusion unit 106 can operate cyclically until a given condition is met.

The image processing apparatus 300 may perform the extending growing for many times to make maximum use of the candidate data obtained by the grayscale morphological reconstruction unit 102, to segment a tree-shaped tubular structure of a higher branching level.

The given condition is that the extending unit 105 cannot obtain an extended branch or the higher-branching level tree-shaped tubular structure obtained is the same as the extended branch. In other words, the given condition is set such that no new tree-shaped tubular structure can be obtained through a further segmentation. For example, the given condition may include at least one of the following conditions: the tubular structures at the twig recognized by the twig recognition unit 104 all reach a predetermined branching level, the extending unit 105 cannot obtain an effective seed point and thus cannot obtain an extended branch, and the second fusion unit 106 cannot fuse any data of the remaining part of the candidate data on the extended branch. Additionally, the given condition may further be set according to actual requirements.

Image processing apparatuses according to embodiments described above with reference to accompanying drawings 1-5 are applicable to various fields. The application of the image processing apparatuses in the segmentation of a medical image is described below as a non-limiting example. It should be appreciated that the description is merely for illustration but is not intended to limit the application of the image processing apparatus, and that the application range of the image processing apparatus is not limited to medical images.

The medical image mentioned here can be an image formed by the data obtained by a medical diagnostic apparatus, which includes but is not limited to: a computer tomography (CT) apparatus, a magnetic resonance imaging (MRI) diagnostic apparatus or a positron emission tomography (PET) apparatus and the like.

In the medicine field, the objects to be segmented usually include airway trees or blood vessels. The segmentation of an airway tree is exemplarily described herein in detail.

As is well known, there are about 24 branching levels from the airway to the pulmonary alveoli of a human being, as if it is an inverted tree, and the reconstruction of the structure of the airway tree on the basis of a medical image is of great clinic importance. However, as the structure of the airway tree is complicated and the branches of higher branching level are finer, it is difficult to directly distinguish an airway from lung tissue in a medical image, and thus, subsequent image processing is needed to reconstruct the airway tree.

First, a sliced scanning is performed by a medical diagnostic apparatus to obtain a series of images of a lung, the images constituting the volume image of the airway tree to be segmented. Then, the volume image is segmented using the image processing apparatuses 100, 200 or 300 described herein.

Specific structures and functions of the image processing apparatuses 100, 200 or 300 are described above in detail and are therefore not described here repeatedly.

In this example, the self-adaptive region growing unit 101 can determine whether the first part of airway tree obtained is correct or not based on the typical branch number of the airway tree. The various thresholds and conditions described above can be determined according to the range of the pixel values and the number of the pixel points generally presented by the airway tree in an image.

In this example, the grayscale morphological reconstruction unit 102 performs grayscale morphological reconstruction based on a local minimum value for each one of the image, as the trachea is present as a grayscale valley in the image. Further, to speed up the processing, the grayscale morphological reconstruction unit 102 may only perform grayscale reconstruction for the trachea of a small dimension, that is, the trachea of a relatively higher branching level.

After the grayscale morphological reconstruction unit 102 obtains candidate data, the first fusion unit 103 performs further binary image region growing on the basis of the first part of airway tree already obtained based on the candidate data, and selects the candidate data to be grown into a second part of airway tree based on the spatial continuity principle of the trachea. The second fusion unit 106 performs the similar operation. It should be appreciated that the binary image region growing further means the supplementation for the data apparently missed in an actually continuous trachea.

Further, the branch extension and the fusion growth may be performed for many times during the use of the image processing apparatus 300, thereby obtaining an airway tree of a smaller dimension (a higher branching level).

It should be appreciated that although the segmentation of an airway tree in the medical field is described by way of example, in practice, the image processing apparatuses may be applied to segmenting an object having a tree-shaped tubular structure in various fields. The image processing apparatuses disclosed herein have advantages of high speed and accuracy and are capable of obtaining a segmented higher-branching level tree-shaped tubular structure.

It is apparent that some processing or methods are also disclosed in the description above on the image processing apparatus according to embodiments. Below, the summary of the methods is described without repeating the details which are already discussed above, however, it should be noted that although disclosed in the description of the image processing apparatus, the methods do not certainly employ or are not certainly executed by the aforementioned components. For example, embodiments of the image processing apparatus may be partially or completely achieved by hardware and/or firmware, and the image processing methods described below may be fully achieved by a computer-executable program, although the image processing methods may employ the hardware and/or firmware of the image processing apparatus.

Figure 6:
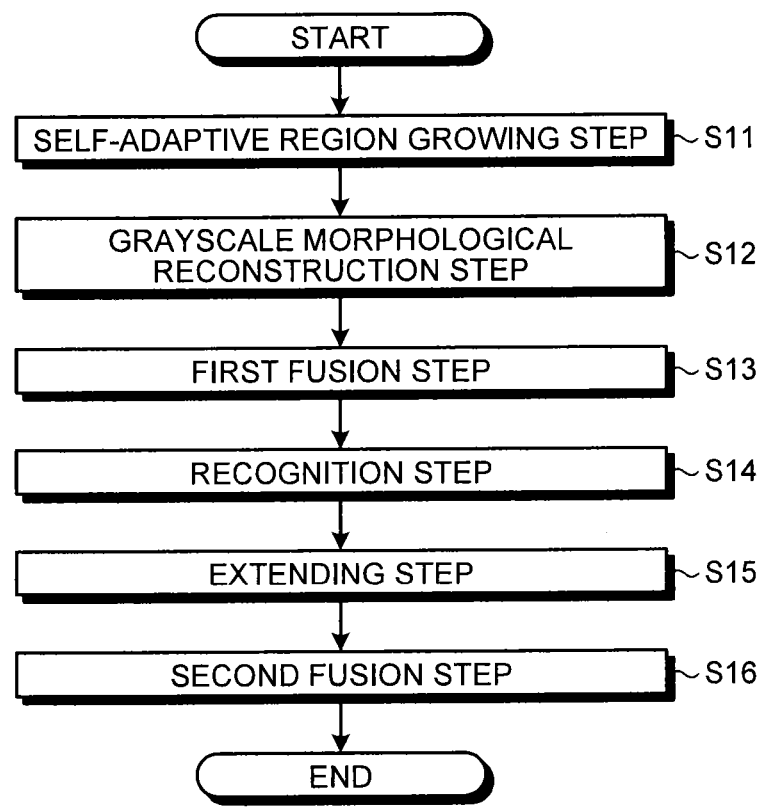
FIG. 6 is a flowchart of an image processing method according to the first embodiment.

FIG. 6 shows the flowchart of an image processing method according to an embodiment, the image processing method for segmenting an object having a tree-shaped tubular structure from a volume image formed by a series of images imaged on the basis of slices includes: a self-adaptive region growing step of performing region growing on the basis of the volume image, based on a seed point and a preset threshold to obtain a first tree-shaped tubular structure (S11); a grayscale morphological reconstruction step of performing grayscale morphological reconstruction based on local extrema for each one of the series of images to obtain candidate data capable of constructing at least part of the tree-shaped tubular structure (S12); a first fusion step of fusing the first tree-shaped tubular structure with at least part of the candidate data to obtain a lower-branching level tree-shaped tubular structure of the object (S13); a recognition step of recognizing the twig of the lower-branching level tree-shaped tubular structure (S14); an extending step of performing further local region growing on the basis of the volume image by taking a pixel point corresponding to the recognized twig as a seed point to obtain an extended branch (S15); and a second fusion step of fusing the extended branch with at least part of the remaining part of the candidate data to obtain a higher-branching level tree-shaped tubular structure of the object (S16).

Figure 7:
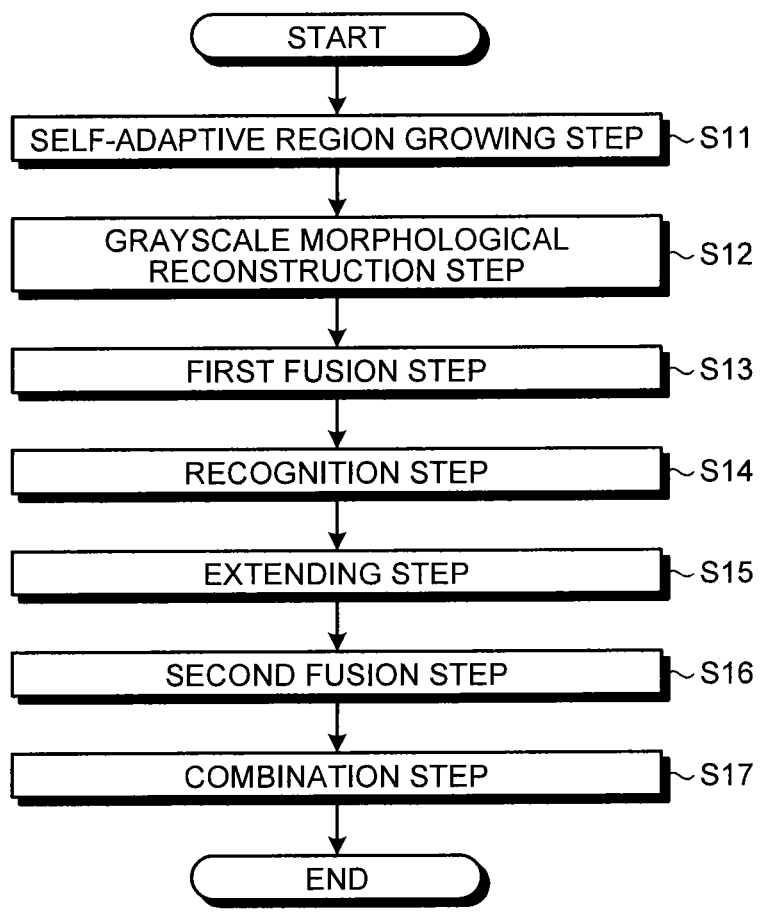
FIG. 7 is a flowchart of an image processing method according to the second embodiment.

FIG. 7 shows the flowchart of an image processing method according to another embodiment. In addition to the steps S11-S16 shown in FIG. 6, the image processing method further includes a combination step of combining the lower-branching level tree-shaped tubular structure with the higher-branching level tree-shaped tubular structure to obtain the tree-shaped tubular structure of the object (S17).

Figure 8:
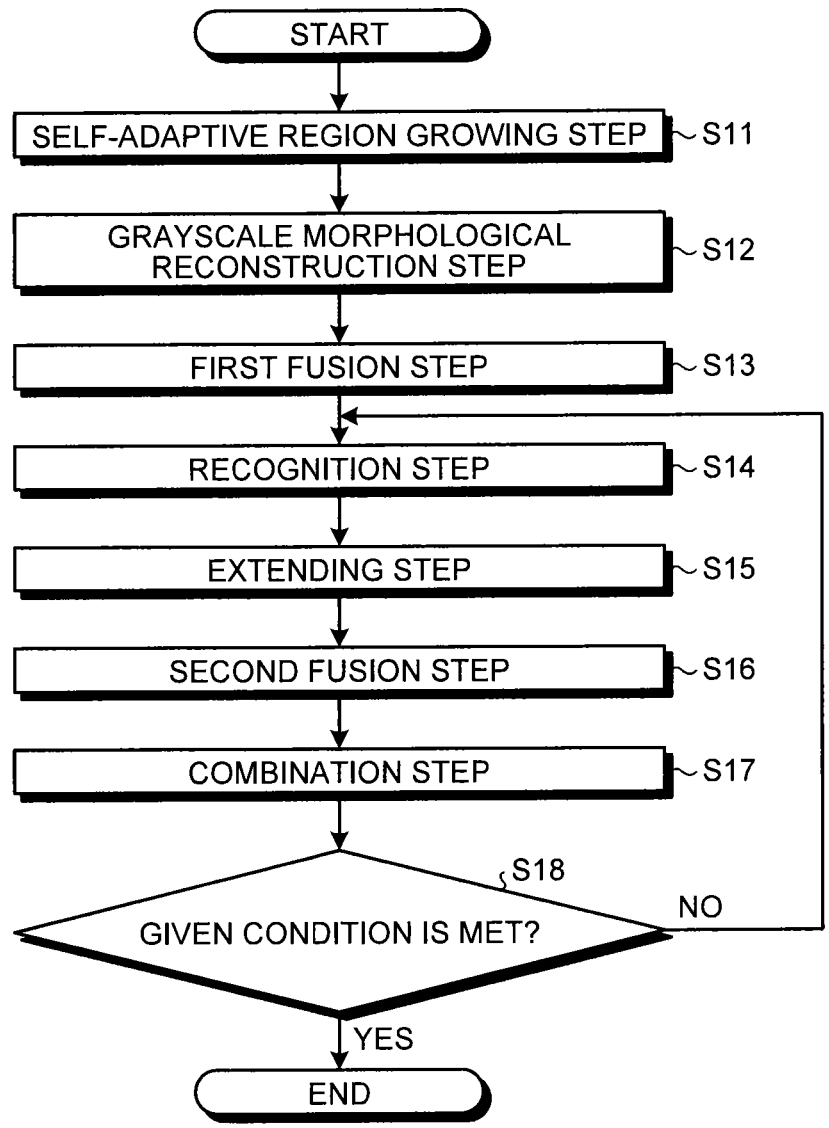
FIG. 8 is a flowchart of an image processing method according to the third embodiment.

FIG. 8 shows the flowchart of an image processing method according to still another embodiment. In addition to the Steps S11-S17 shown in FIG. 7, the image processing method further includes a step of repeatedly executing the recognition step S14, the extending step S15 and the second fusion step S16 by taking the obtained tree-shaped tubular structure of the object as a lower-branching level tree-shaped tubular structure, until a given condition is met.

The given condition can be that no extended branch can be obtained in the extending step S15 or the higher-branching level tree-shaped tubular structure obtained in the second fusion step S16 is the same as the extended branch. Additionally, the given condition may further be set according to actual requirements.

In the image processing methods shown in FIG. 6, FIG. 7 and FIG. 8, different preset thresholds may be used in the local region growing and in the region growing performed to obtain the first tree-shaped tubular structure. In an embodiment, the preset threshold may include the region growing threshold and the leakage controlling threshold.

In an embodiment, the first fusion step S13 includes performing binary image region growing based on the candidate data on the first tree-shaped tubular structure; the second fusion step S16 includes performing binary image region growing based on the remaining part of the candidate data on the extended branch, wherein the binary image region growing includes growing the part of the candidate data spatially connected with each branch of the first tree-shaped tubular structure into a second tree-shaped tubular structure and growing the part of the remaining part of the candidate data spatially connected with the extended branch into a third tree-shaped tubular structure, wherein the first tree-shaped tubular structure and the second tree-shaped tubular structure form the lower-branching level tree-shaped tubular structure, and the extended branch and the third tree-shaped tubular structure form the higher-branching level tree-shaped tubular structure.

The grayscale morphological reconstruction step S12 may include acquiring a plurality of groups of candidate data of a tree-shaped tubular structure different in dimension. The candidate data relatively large in dimension, i.e., relatively lower in branching level can be used in the first fusion step S13, and the candidate data relatively small in dimension, i.e., relatively higher in branching level can be used in the second fusion step S16.

In an embodiment, the recognition unit 14 further includes determining the branching level of the tubular structure at the recognized twig in the tree-shaped tubular structure, and reserving the corresponding twig only when the branching level is lower than a predetermined branching level. The branching level of the tubular structure at the twig can be determined based on the sectional area of a lumen at the twig.

As shown in FIG. 9, an example of the recognition step S14 may further include the following sub-steps: extracting the central line of a tube in the lower-branching level tree-shaped tubular structure (S401), and recognizing the end point of the central line in a direction away from the trunk of the tree-shaped tubular structure (S402). For example, the central line may be extracted using a skeletonization method based on distance transform or a three-dimensional thinning method based on topology structure, and the point on the central line which is adjacent to the other points on the central line only in one of 26 neighborhoods is taken as an end point.

The extending step S15 further includes comparing the pixel value of the recognized seed point with a predetermined seed point threshold range and discarding the seed point the pixel value of which is beyond the predetermined seed point threshold range.

As an exemplary embodiment, the above image is a medical image formed by the data obtained via a medical diagnostic apparatus. The object to be segmented is an airway tree, blood vessels or the like.

It should be appreciated that the image processing apparatus and method described herein are applicable to processing various images, for example, medical images.

As stated above, the image processing method provided herein is capable of sufficiently combining advantages of the self-adaptive region growing method with the grayscale morphological reconstruction method to obtain a tree-shaped tubular structure of a relatively high branching level, while maintaining relatively high computation speed and relatively high accuracy.

More specific details of each step of the image processing method and more possible steps of the image processing method may be referred to the description on each component of the image processing apparatus provided in the above and therefore are not described herein.

Fourth Embodiment

FIG. 10 is a schematic block diagram illustrating a medical imaging device according to an embodiment. In order not to obscure the spirit and scope of the present invention, other possible components of the medical imaging device are omitted in FIG. 10. The medical imaging device 1000 includes an image processing apparatus 1010 which is arranged to segment an input volume image. The image processing apparatus 1010 may be the image processing apparatus 100, 200 or 300 described in any one of the embodiments above. The medical diagnostic device may be, but not limited to: a computer tomography (CT) apparatus, a magnetic resonance imaging (MRI) diagnostic apparatus or a positron emission tomography (PET) apparatus or the like.

The image processing apparatus may be arranged in the medical imaging device in a specific way or manner that is well known to those skilled in the art and therefore is not described herein.

As an example, each step of the aforementioned image processing method and each unit of the aforementioned image processing apparatus may be implemented as software, firmware, hardware or the combination thereof. In the case where the steps or units are realized by software or firmware, a software program for realizing the above mentioned method may be installed in a computer with a dedicated hardware structure (e.g. the general computer 1100 shown in FIG. 11) from a storage medium or network, wherein the computer is capable of implementing various functions when installed with various programs.

Figure 11:
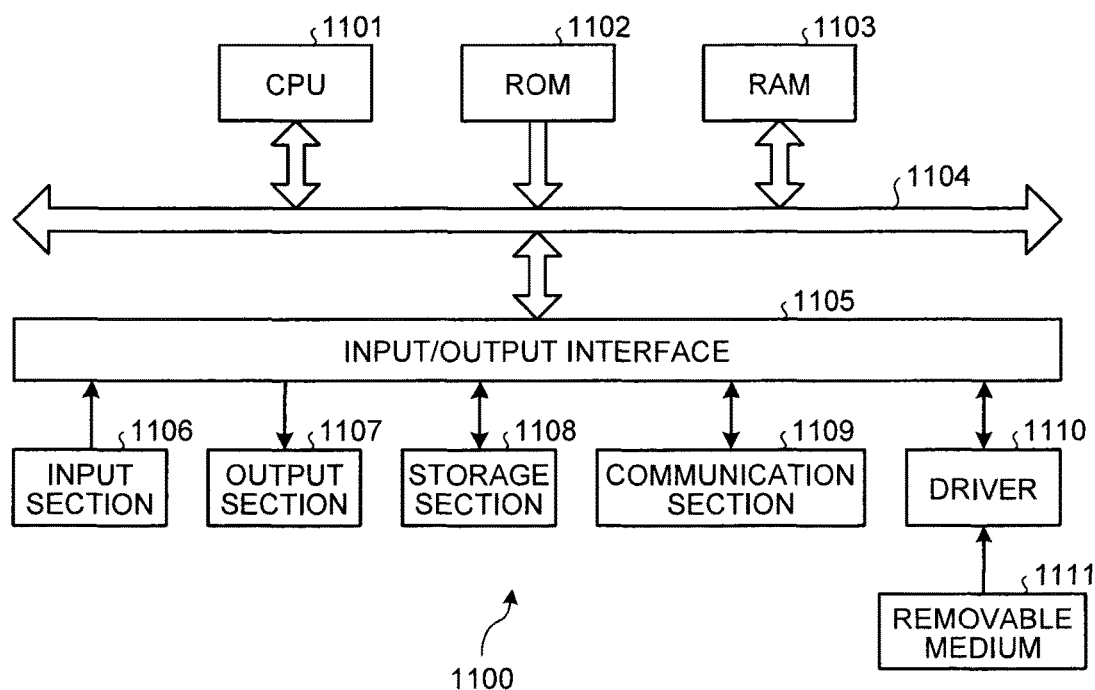
FIG. 11 is an exemplary block diagram illustrating the structure of a computer capable of realizing each of the embodiments.

In FIG. 11, a computing processing unit (namely, CPU) 1101 executes various processing according to a program stored in a read-only memory (ROM) 1102 or a program loaded to a random access memory (RAM) 1103 from a storage section 1108. The data needed for the various processing of the CPU 1101 may be stored in the RAM 1103 as needed. The CPU 1101, the ROM 1102 and the RAM 1103 are linked with each other via a bus 1104. An input/output interface 1105 is also linked to the bus 1104.

The following components are linked to the input/output interface 1105: an input section 1106 (including keyboard, mouse and the like), an output section 1107 (including displays such as cathode ray tube (CRT), a liquid crystal display (LCD), a loudspeaker and the like), a storage section 1108 (including hard disc and the like), and a communication section 1109 (including a network interface card such as a LAN card, modem and the like). The communication section 1109 performs communication processing via a network such as the Internet. A driver 1110 may also be linked to the input/output interface 1105, if needed. If needed, a removable medium 1111, for example, a magnetic disc, an optical disc, a magnetic optical disc, a semiconductor memory and the like, may be installed in the driver 1110 so that the computer program read therefrom is installed in the memory section 1108 as appropriate.

In the case where the foregoing series of processing is achieved through software, programs forming the software are installed from a network such as the Internet or a memory medium such as the removable medium 1111.

It should be appreciated by those skilled in the art that the memory medium is not limited to the removable medium 1111 shown in FIG. 11, which has program stored therein and is distributed separately from the apparatus so as to provide the programs to users. The removable medium 1111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1102 and the storage section 1108 in which programs are stored, and can be distributed to users along with the device in which they are incorporated.

The embodiments further disclose a program product in which machine-readable instruction codes are stored. The aforementioned image processing methods can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the foregoing description on the specific embodiments of the present invention, the features described and/or shown for an embodiment may be used in one or more other embodiments in the same or similar way or combined with those in the other embodiments, or replace those in the other embodiments.

It should be emphasized that the terms 'comprise/include', as used herein, means the existence of a feature, element, step or component in a way not exclusive of the existence or addition of one or more other features, elements, steps or components.

In the aforementioned embodiments and examples, each step and/or unit is represented with a reference sign consisting of figures. It should be understood by those of ordinary skill of the art that the reference signs are merely intended to facilitate description and drawing but are not to be construed as a limitation on an order or any other aspect.

Furthermore, the methods provided in the present invention may be performed sequentially, synchronously or independently in accordance with another time sequences, not limited to the time sequence described herein. Therefore, the implementation orders of the methods described in this specification are not to be construed as a limitation to the scope of the present invention.

Although the present invention has been disclosed with reference to specific embodiments herein, it should be understood that all the embodiments and examples described above are merely illustrative of the present invention but are not to be construed as limiting the present invention. Various modifications, improvements or equivalents can be devised by those skilled in the art without departing from the spirit and scope of the invention, and such modifications, improvements or equivalents should be considered to fall within the scope of the present invention.

What is claimed is:

1. An image processing apparatus, comprising:
   a memory configured to store a volume image of a three-dimensional region of a subject; and
   processing circuitry configured to
      generate a plurality of slice images corresponding to a plurality of slices each substantially perpendicular to a predetermined reference axis from the volume image,
      extract a target region from the plurality of slice images,
      detect an end point from the extracted region, and
      extract a tubular structure based on the end point,
   wherein the processing circuitry is further configured to
      extract the tubular structure through
         obtaining a first fused part of a tree-shaped tubular structure by fusing a first tree-shaped tubular structure together with a first part of candidate data based on spatial continuity of the first tree-shaped tubular structure, the first tree-shaped tubular structure being obtained by using first region growing, and the candidate data being obtained by using grayscale morphological reconstruction,
         after obtaining the first fused part of the tree-shaped tubular structure, recognizing a twig of the obtained first fused part of tree-shaped tubular structure,
         performing second region growing by using the twig to obtain an extended branch, and
         obtaining a second fused part of the tree-shaped tubular structure by fusing the extended branch together with a second part of the candidate data based on spatial continuity of the extended branch.

2. The image processing apparatus according to claim 1, wherein the processing circuitry is further configured to
perform the first region growing on the basis of the volume image, based on a seed point and a first preset threshold, to obtain the first fused tree-shaped tubular structure,
perform the grayscale morphological reconstruction based on local extrema for each one of a series of images, to obtain the candidate data, and
perform the second region growing based on the volume image to obtain the extended branch based on a pixel point corresponding to the recognized twig as the branch seed point and a second preset threshold.

3. The image processing apparatus according to claim 1, wherein the processing circuitry is further configured to combine the first fused part of the tree-shaped tubular structure with the second fused part of the tree-shaped tubular structure, to obtain the tree-shaped tubular structure.

4. The image processing apparatus according to claim 3, wherein the processing circuitry is further configured to cyclically obtain a higher-branching level tree-shaped tubular structure of the subject based on a tubular structure obtained in a previous operation cycle as a lower-branching level tree-shaped tubular structure until a given condition is met.

5. The image processing apparatus according to claim 4, wherein the given condition is that the processing circuitry cannot obtain an extended branch or the higher-branching level tree-shaped tubular structure obtained is the same as the extended branch.

6. The image processing apparatus according to claim 1, wherein the processing circuitry is further configured to determine a branching level of a tubular structure at the recognized twig in the fused first part of the tree-shaped tubular structure and reserve the corresponding twig only when the branching level is lower than a predetermined branching level.

7. The image processing apparatus according to claim 6, wherein the processing circuitry is further configured to determine the branching level of the tubular structure at the recognized twig based on a sectional area of a lumen at the twig.

8. The image processing apparatus according to claim 1, wherein the processing circuitry is further configured to
extract a central line of a tube in the first fused part of the tree-shaped tubular structure; and
recognize an end point of the central line in a direction away from a trunk of the tree-shaped tubular structure.

9. The image processing apparatus according to claim 8, wherein the processing circuitry is further configured to take a point on the central line which is adjacent to only one of the other points as the end point.

10. The image processing apparatus according to claim 2, wherein the processing circuitry is further configured to compare a pixel value of the recognized branch seed point with a predetermined seed point threshold range and discard the branch seed point when the pixel value of which is beyond the predetermined seed point threshold range.

11. The image processing apparatus according to claim 2, wherein the processing circuitry is further configured to use different preset thresholds in the first region growing performed to obtain the first fused part of the tree-shaped tubular structure and in the second region growing performed to obtain the extended branch.

12. The image processing apparatus according to claim 2, wherein the first preset threshold or the second preset threshold comprises a region growing threshold and a leakage controlling threshold.

13. The image processing apparatus according to claim 1, wherein
the processing circuitry is further configured to
perform binary image region growing based on the first part of the candidate data on the first tree-shaped tubular structure, and
perform binary image region growing based on the second part of the candidate data on the extended branch,
the binary image region growing performed on the first tree-shaped tubular structure comprises growing a portion of the candidate data spatially connected with each branch of the first tree-shaped tubular structure into a second tree-shaped tubular structure,
the binary image region growing performed on the extended branch comprises growing another portion of the candidate data spatially connected with the extended branch into a third tree-shaped tubular structure, and
the first tree-shaped tubular structure and the second tree-shaped tubular structure form a lower-branching level tree-shaped tubular structure, and the extended branch and the third tree-shaped tubular structure form a higher-branching level tree-shaped tubular structure.

14. The image processing apparatus according to claim 1, wherein the processing circuitry is further configured to obtain a plurality of groups of candidate data of the tree-shaped tubular structure different in dimension respectively.

15. The image processing apparatus according to claim claim 14, wherein the processing circuitry is configured to
fuse the first tree-shaped tubular structure with the candidate data large in dimension in the plurality of groups of candidate data, and
fuse the extended branch with the candidate data small in dimension in the plurality of groups of candidate data.

16. The image processing apparatus according to claim 1, wherein the image is a medical image formed by data obtained via a medical diagnostic apparatus.

17. The image processing apparatus according to claim 1, wherein the subject is an airway tree or blood vessels.

18. The image processing apparatus according to claim 8, wherein the processing circuitry is further configured to edit the central line in accordance with an instruction of an operator.

19. The image processing apparatus according to claim 2, wherein the processing circuitry is further configured to update at least one of the first preset threshold for the first region growing and a set value for the grayscale morphological reconstruction in accordance with an instruction of an operator.

20. An image processing method executed by an image processing apparatus wherein the image processing apparatus comprises a memory configured to store a volume image of a three-dimensional region of a subject, the image processing method comprising:
generating a plurality of slice images corresponding to a plurality of slices each substantially perpendicular to a predetermined reference axis from the volume image;
extracting a target region from the plurality of slice images;
detecting an end point from the extracted region; and
extracting a tubular structure based on the end point, wherein the image processing method further comprises extracting the tubular structure through obtaining a first fused part of a tree-shaped tubular structure by fusing a first tree-shaped tubular structure together with a first part of candidate data based on spatial continuity of the first tree-shaped tubular structure, the first tree-shaped tubular structure being obtained by using first region growing, and the candidate data being obtained by using grayscale morphological reconstruction, after obtaining the first fused part of the tree-shaped tubular structure, recognizing a twig of the obtained first fused part of tree-shaped tubular structure, performing second region growing by using the twig to obtain an extended branch, and obtaining a second fused part of the tree-shaped tubular structure by fusing the extended branch together with a second part of the candidate data based on spatial continuity of the extended branch.

21. A medical imaging device, comprising:

a memory configured to store a volume image of a three-dimensional region of a subject; and processing circuitry configured to generate a plurality of slice images corresponding to a plurality of slices each substantially perpendicular to a predetermined reference axis from the volume image, extract a target region from the plurality of slice images, detect an end point from the extracted region, and extract a tubular structure based on the end point, wherein the processing circuitry is further configured to extract the tubular structure through obtaining a first fused part of a tree-shaped tubular structure by fusing a first tree-shaped tubular structure together with a first part of candidate data based on spatial continuity of the first tree-shaped tubular structure, the first tree-shaped tubular structure being obtained by using first region growing, and the candidate data being obtained by using grayscale morphological reconstruction, after obtaining the first fused part of the tree-shaped tubular structure, recognizing a twig of the obtained first fused part of tree-shaped tubular structure, performing second region growing by using the twig to obtain an extended branch, and obtaining a second fused part of the tree-shaped tubular structure by fusing the extended branch together with a second part of the candidate data based on spatial continuity of the extended branch.

22. The medical imaging device according to claim 21 is a computer tomography device or a magnetic resonance imaging device.

* * * * *